A. W. OLDS.
APPARATUS FOR OPERATING VEHICLE WARNING SIGNS.
APPLICATION FILED FEB. 19, 1919.
1,358,102.
Patented Nov. 9, 1920.
2 SHEETS—SHEET 1.
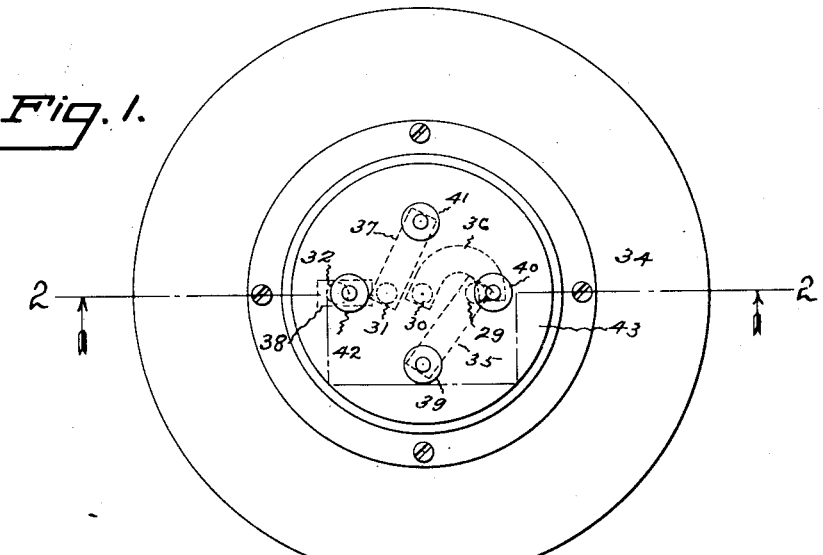
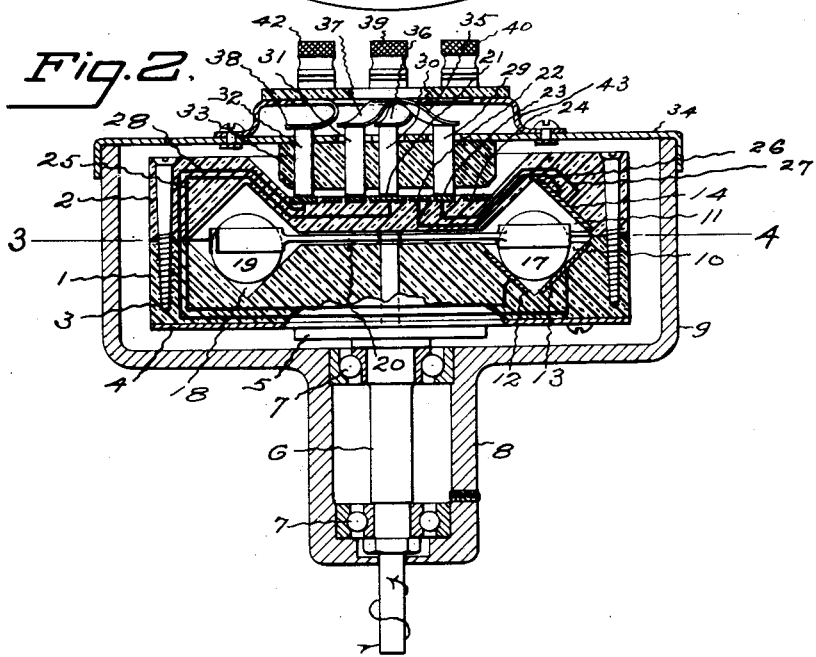
Inventor
Alfred W. Olds by
Harry P. Williams
Attorney

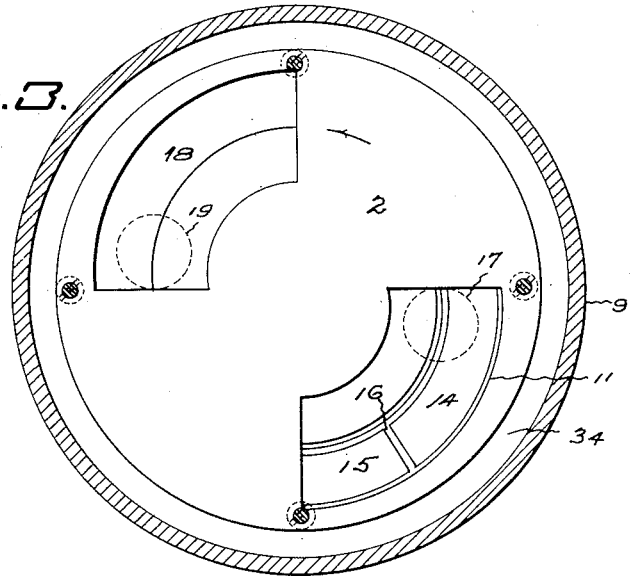
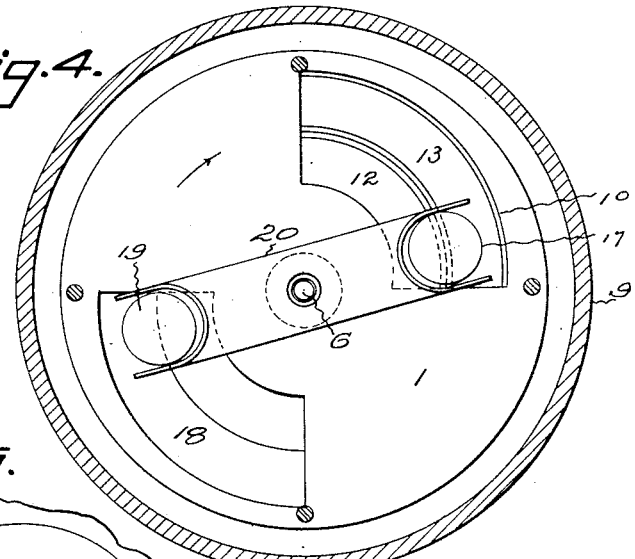
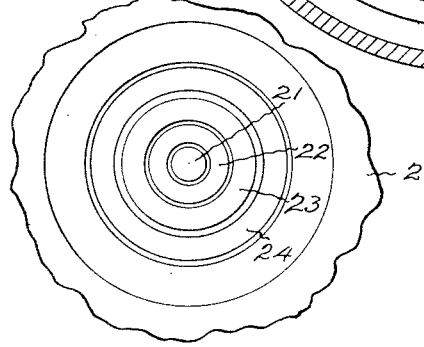

UNITED STATES PATENT OFFICE.

ALFRED W. OLDS, OF WINDSOR, CONNECTICUT.

APPARATUS FOR OPERATING VEHICLE-WARNING SIGNS.

1,358,102.  Specification of Letters Patent.  Patented Nov. 9, 1920.

Application filed February 19, 1919. Serial No. 277,988.

*To all whom it may concern:*

Be it known that I, ALFRED W. OLDS, citizen of the United States, residing at Windsor, in the county of Hartford and State of Connecticut, have invented a new and useful Improvement in Apparatus for Operating Vehicle-Warning Signs, of which the following is a specification.

This invention relates to an apparatus which is designed to be placed on pleasure and commercial automobiles, trolley and tram cars, and similar vehicles which are operated on highways, for controlling electric circuits connected with a sign or other warning signal arranged to show or indicate a change in the rate of speed of the vehicle to which the apparatus is applied.

The object of the invention is to provide a very simple, compact, sensitive and effective apparatus which will automatically make the necessary shifts in the electric circuits as the speed of the vehicle changes, to cause the sign or other warning signal which is connected in or actuated by the electric circuits to show or indicate to others such variations in the speed of the vehicle.

In attaining this end a carrier with a chamber at one side of its axis is fastened upon a spindle that is adapted to be rotated from some moving part of the vehicle. Secured to the walls of this chamber in the rotatable carrier are conducting contacts that are electrically connected with binding posts to which the wires of the circuits including the sign or signal apparatus are connected, and in the chamber is a weighted ball of conducting material that is retained in such a manner that it can roll to various positions and connect the several contacts on the walls of the chamber according as it is governed by its inertia and momentum and the action of centrifugal force and gravity as the carrier is rotated at different speeds or remains stationary.

Figure 1 of the accompanying drawings shows a plan of an apparatus that embodies this invention. Fig. 2 shows a vertical section of the apparatus on the dotted line 2—2 on Fig. 1. Fig. 3 shows a horizontal section looking up on the plane indicated by the dotted line 3—4 on Fig. 2. Fig. 4 shows a horizontal section looking down on the plane indicated by the dotted line 3—4 on Fig. 2. Fig. 5 is a view of a portion of the top of the carrier showing the contact rings thereon.

The carrier of the device illustrated is formed of a lower disk 1 of insulating material and an upper disk 2 of insulating material secured face to face by screws 3. This carrier is fastened to a metal plate 4 which is set upon a flange 5 that is secured to a spindle 6. The spindle which is arranged vertically upon anti-friction bearings 7 located in the hub 8 of the cylindrical casing 9 is designed to be connected with and rotated by any convenient and suitable rotating part of the vehicle upon which the device is mounted.

In the top face of the lower carrier disk is an arcuate groove 10 of V cross section, and in the bottom face of the upper carrier disk is an arcuate groove 11 of V cross section. The centers of the arcs of these grooves are not coincident with the centers of the disks but are slightly offset so that the grooves are eccentric with relation to the axis of rotation of the carrier. These grooves complement each other so that when the disks are put together a chamber is provided which is substantially square in cross section and the path formed by this chamber is nearer the center or axis of rotation of the disks at the leading end than at the trailing end of the eccentric chamber as the disks rotate in the operation of the device.

On the inner lower wall of this chamber is a conducting plate 12, and on the outer lower wall of this chamber is a conducting plate 13, these plates being represented as out of contact with each other and extending the entire length of the chamber. On the outer upper wall of the chamber are two conducting plates 14 and 15 that are separated by an insulated gap 16. In the chamber, and free to roll from end to end over the contact plates, is a weighted ball 17 of conducting material. In order to counterbalance this structure an arcuate chamber 18 that is square in cross section and eccentrically located is formed between the faces of the carrier disks on the other side of the center, and in this chamber a weighted ball 19 is placed. The contact ball and the counterbalancing ball are loosely retained so that they will act in consonance by the forked ends of a plate 20 which is arranged between the two carrier disks so that it may turn freely about the spindle and independently of the carrier.

In a recess in the top face of the upper carrier disk is a central conducting contact 21, an annular conducting contact 22, an annular conducting contact 23, and an annular conducting contact 24, these contacts being separated from each other and located centrally with relation to the axis of rotation of the carrier. The contact 21 on top is connected with the plate 12 in the chamber by a conductor 25, the contact 22 is connected with the plate 15 by a conductor 26, the contact 23 is connected with the plate 14 by a conductor 27, and the contact 24 is connected with the plate 13 by a conductor 28, these conductors being arranged in the carrier in any convenient manner.

Bearing down upon the top contacts which rotate with the carrier are four brushes 29, 30, 31, 32 that are retained by an insulating block 33 attached to the under side of the cover 34 of the casing. These brushes are pressed down by conducting spring fingers 35, 36, 37, 38 which are connected with the lower ends of binding posts 39, 40, 41, 42, that are mounted upon a cap 43 fastened to the top of the cover of the casing.

When the carrier is stationary the ball 17 lies between and electrically connects the plates 12 and 13 and establishes a circuit through the connections described to wires that may be attached to the binding posts 40 and 42. When the carrier is rotated slowly, centrifugal force causes the ball 17 to roll out and up and electrically connect the plates 13 and 14 and establishes a circuit to wires that may be attached to the binding posts 39 and 42, and when the carrier is rotating rapidly the ball 17 rolls to the far outer end of the chamber and electrically connects the plates 13 and 15 and establishes a circuit to wires that may be attached to the binding posts 41 and 42. As long as the speed of the carrier is uniform the ball remains as a result of centrifugal force electrically connecting the plates 13 and 15, they extending farthest out from the axis of rotation, but should the speed of the carrier be retarded, as by slowing down of the vehicle on which the device is mounted, the ball as a result of its momentum rolls forward and electrically connects the contact plates 13 and 14, and then when the vehicle stops and the carrier remains stationary the ball rolls down and electrically connects the plates 12 and 13.

Circuit wires may be led from the binding post to any available source of current and any desired sign or signal apparatus which may be located on the vehicle in convenient position to be observed. Desirably such a sign would give three indications—clear, slow and stop.

The invention claimed is:

1. An apparatus for operating vehicle signs having a rotarily mounted chambered carrier, means for rotating the carrier, a plurality of contact plates attached to the walls of the chamber in the carrier at different distances radially outward from the axis of rotation of the carrier, an electrically conducting ball in said chamber and adapted to make connection between different contact plates as it rolls from position to position under centrifugal action, inertia and gravity during the operation of the apparatus, means for the attachment of a plurality of circuit wires, and conductors respectively connecting the several wire attaching means with the several contact plates.

2. The apparatus described by claim 1 characterized by having the chamber curved about the axis of rotation and of angular cross section with the contact plates arranged on the sides of said chamber.

3. The apparatus described by claim 1 characterized by having the chamber curved and extending eccentrically with relation to the axis of rotation of the carrier.

4. The apparatus described by claim 1 characterized by having in the carrier a freely rotating plate with a forked end for guiding the ball.

5. The apparatus described by claim 1 characterized by having a counterbalancing ball and a plate retaining the balls so that they act in consonance.

6. An apparatus for operating vehicle signs having a rotatory carrier provided with a chamber at one side of its axis, means for rotating the carrier, conducting plates located in the chamber in the carrier, conducting contacts located on the upper surface of the carrier, conductors connecting the plates in the carrier with the the contacts on the upper surface, an electrically conducting ball in said chamber and adapted to make connection between different contact plates as it rolls from position to position, stationary brushes engaging the contacts on the upper surface of the carrier, conducting spring fingers bearing on the brushes, and binding posts connected with the spring fingers.

7. The apparatus described by claim 6 characterized by having the carrier formed of two pieces of insulating material fastened together face to face with a portion of the chamber in each section.

ALFRED W. OLDS.